United States Patent [19]
Gellekink et al.

[11] 3,820,113
[45] June 25, 1974

[54] TARGET TAKE-OVER CIRCUIT
[75] Inventors: Bernard Gellekink, Hangelo;
Theodorus Albertus Clemens,
Almelo, both of Netherlands
[73] Assignee: N. V. Hollands Signaalapparaten,
Hengelo (O), Netherlands
[22] Filed: Dec. 14, 1972
[21] Appl. No.: 314,911

[30] Foreign Application Priority Data
Dec. 15, 1971   Netherlands .................. 7117162

[52] U.S. Cl. ............................................ 343/7.3
[51] Int. Cl. ........................................... G01s 9/16
[58] Field of Search .................................. 343/7.3

[56] References Cited
UNITED STATES PATENTS
3,646,588   2/1972   Van Popta ..................... 343/7.3
3,716,858   2/1973   Worthington ................... 343/7.3
3,718,927   2/1973   Howard ....................... 343/7.3 X Primary Examiner—T. H. Tubbesing
Attorney, Agent, or Firm—Frank R. Trifari; Simon L. Cohen

[57] ABSTRACT

A target take-over circuit, being aligned with estimated target positions, causes a wide range gate to follow up a series of estimated range values. Each of these values render a counter position, which is compared with a previous reduced counter position to obtain a timing interval. During this interval the access to each of the range gate channels is enabled and disabled successively, while the range gate channel, supplied with a video signal, delivers a square-wave reference voltage, of which the duration corresponds with the target range, valid at the moment of detection. The range servo follows up said voltage, whereupon a tracking system is actuated.

10 Claims, 2 Drawing Figures

TARGET TAKE-OVER CIRCUIT

The invention relates to a target take-over circuit for a radar system which comprises a radar search and a radar tracking apparatus and which is provided with a number of range gate channels connected in parallel, a control circuit and a range servo, where the control circuit contains at least a gate pulse generator with the aid of which the access to each of the range gate channels is enabled and disabled successively, which target take-over circuit causes, during the time when the tracking radar is being aligned with the indicated azimuth value of a target detected by the search radar and is performing an elevation scan, a wide range indication gate to follow up a series of estimated range values, each of which corresponding with a continually changing target range obtained by means of the search radar, which range indication gate is divided into a number of gates corresponding with the number of range gate channels, and as soon as the tracking radar has detected the target in one of the range gate channels, the control circuit aligns the range servo with the momentary target range.

Such a target take-over circuit is known from the U.S. Pat. No. 3,550,126, describing a target take-over circuit, not referred to as such, which is controlled by wide range gate pulses and which comprises at least a pulse regenerator, two threshold circuits, a pulse stretcher, a sum-and-difference circuit and a delay line canceller which is fed with one of the coherently detected intermediate-frequency signals mentioned in this patent, while said target take-over circuit further comprises selecting means for a coarse selection of target signals from the output signal of the delay line canceller, and range error detection means, responsive to the selected target signals, to produce an error signal which is a measure for a range error in the target indication or target tracking procedure; this error signal, fed to the gate pulse generator, keeps the wide-range gate pulses in coincidence with the target signals. The output of the delay-line canceller is connected to the two threshold circuits of which one is controlled by early wide-gate pulses and the other by subsequent late wide-gate pulses. The outputs of these threshold circuits are connected, on the one hand, via a pulse stretcher to a difference circuit and, on the other hand, via the summing circuit to a pulse regenerator formed by a blocking oscillator. The difference circuit output is connected to a range servo, with the aid of which a time modulator forming part of the gate pulse generator is controlled. Upon the receipt of each target signal the pulse generator delivers a standard output pulse, which is fed successively to an integrator via a gate circuit and a pulse stretcher, where the integrator output signal, on reaching a certain level, causes the switching means to actuate the range tracking system, while said gate circuit is controlled by narrow range gate pulses whose moment of appearance has a fixed time relationship with that of the above-mentioned wide range gate pulses.

The delay line canceller, forming part of the target take-over circuit, described in the above-mentioned patent, has however not been inserted in this circuit as a fixed component but, when the target is being taken over, said canceller is temporarily extracted from a canceller combination provided in the detection chain of the search radar (not described in the above-mentioned patent). The presence of a canceller combination in said detection chain is to prevent the failure of the search radar to detect moving objects with "blind speeds," for this is the case when using one single canceller in said detection chain; therefore, the "blind speeds" are introduced into the search procedure when extracting a canceller from said combination for the target take-over circuit.

Another disadvantage of the use of a delay line canceller in a target take-over circuit is that the frequency characteristic of the canceller shows a sinusoidal response. Doppler signals derived from echo signals of objects with different radial speeds have different frequencies and will therefore not be amplified to the same extent.

Still another disadvantage of the above-mentioned target take-over circuit is the use of wide range gates for the purpose of target detection, at which a range gate channel is rendered open for a considerably long period to await the receipt of a short duration signal, thus furthering an unfavorable signal-to-noise ratio.

Yet another disadvantage is that, following an initial coarse detection of a target by the target take-over circuit, a relatively long time (about 1 sec) is required before the moment of appearance of the wide range gates is so adjusted that the presence of the separation between the early and the late wide gate coincides with the moment of detection of said target. This long period is connected with the desire to carry out a target take-over procedure also when receiving weak target echoes; however, it remains obscured whether such a target echo will be detected during each pulse repetition time of a synchronization pulse. S. During the period in which one or more expected target echoes are not detected, the moment of appearance mentioned above cannot be adjusted, while this moment can be changed through noise signals. Hence, a quick adjustment is out of the question. During this long period the overshoot of the tracking antenna renders the danger that the target may come at the edge of the radar beam or even outside of this beam; this presents difficulties, since the wide range gates can only be adjusted here with the aid of a series of echo signals still to be detected. In addition to the fact that it concerns a moving target, a quick adjustment of the wide range gates can hardly be effected, while also the accuracy may be insufficient.

It is an object of the present invention to provide a target take-over circuit in which the above-mentioned disadvantages are either obviated or reduced to a considerable extent.

In accordance with the present invention, the target take-over circuit contains a time modulator which, upon the supply of said series of range values, produces a series of range pulses rendering successively, with the aid of a counter of the control circuit, a series of counter positions that represent the above-mentioned range values; the control circuit is further provided with a digital comparator, in which the momentary position of the counter is compared with a value derived from a counter position already obtained, which comparator indicates, in the case of equivalence, a time interval during which the gate pulses originating from gate pulse generator are fed to the respective range gate channels, and also with a number of logic circuits, each of which being connected to a corresponding range gate channel, while the logic circuit that is supplied with a quantized video signal delivers a square-wave reference voltage, the duration of which corresponds with the above-mentioned target range valid at the moment of detection and the range servo, responsive to the range pulse last obtained, follows up the trailing edge of said square-wave reference voltage, whereupon a range tracking system is actuated.

In the two embodiments of the target take-over circuit, in accordance with the invention, each of the range gate channels is provided with a doppler filter for the purpose of selecting echo signals of moving objects from the supplied video data, thus obviating the temporary incorporation of a delay line canceller from the detection chain of the search radar into the target take-over circuit; therefore, the canceller combination required with the search procedure is being fully retained also during the target take-over procedure.

By the application of a doppler filter in each of the range channels, a sinusoidal frequency characteristic, causing a different amplification of the signals with different frequencies, can be avoided; it is therefore preferred to design the doppler filters as bandpass filters with a constant response.

Since the target take-over circuit now contains several narrow range gate channels instead of two wide range gate channels, the signal-to-noise ratio of the target take-over circuit is improved.

The relatively long period mentioned above as the last disadvantage, which period is required for adjusting the wide range gates, for example, of successively arriving echo signals from a target to be tracked, is reduced to a few milliseconds, since the adjustment of a range pulse relevant to a wide range gate now occurs as soon as a range gate channel has detected a limited number of target echoes necessary for obtaining one single output signal of a narrow range gate. The above-mentioned adjustment is effected with the aid of this single fixed output signal with the result that neither an overshoot of the tracking antenna nor the presence of noise signals influences the adjustment of said range pulse.

The present invention and the attendant advantages thereof are further explained by means of the figures of which.

It will be clear that the present invention is in no way limited here; the target take-over circuit, in accordance with the invention, may be applied also in other radar systems.

Figure 1:
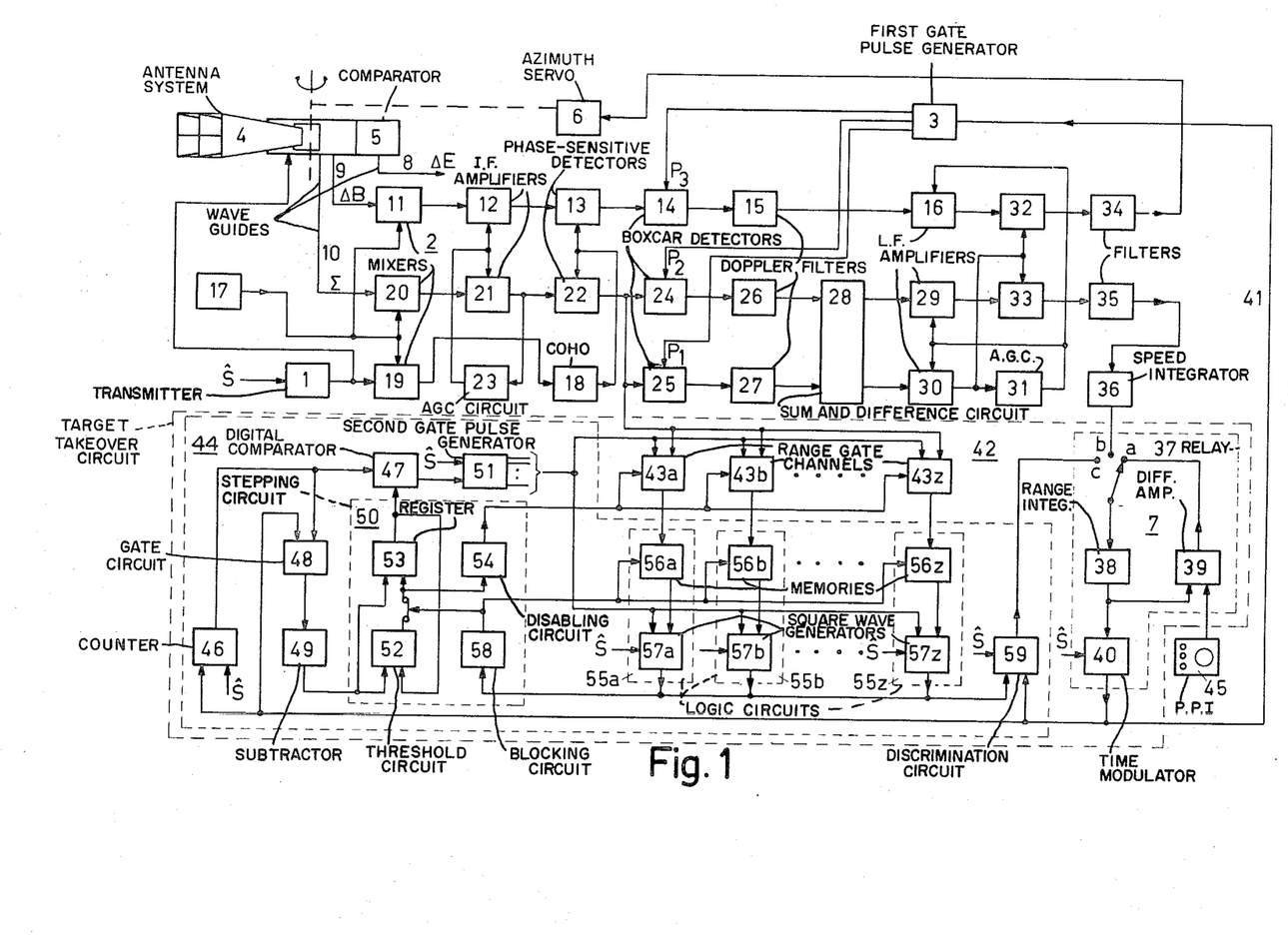
FIG. 1 illustrates a block diagram of a monopulse radar apparatus, showing a first embodiment of a target take-over circuit, in accordance with the invention.

The type of radar apparatus, shown schematically in FIG. 1 is based on the sum-and-difference method and can be used to track a moving target in two angular coordinates and in range. For this purpose the radar apparatus shown comprises a transmitter 1, a receiver 2 and a first gate pulse generator 3. Transmitter pulses are transmitted, via the antenna system 4, in the rhythm of the synchronization pulses (Ŝ) delivered by a synchronization pulse generator not shown in the figure.

As is customary with a monopulse radar apparatus based on the sum-and-difference method, the energy received in consequence of a target echo is converted, with the aid of a comparator 5, into an elevation difference signal $\Delta E$, an azimuth difference signal $\Delta B$, and a sum signal $\Sigma$. These signals contain amplitude and phase information which is a measure for the magnitude and direction of the target deviation with respect to the radar symmetry axis. Hence, these signals may be used for the generation of the error signals required for the control of an azimuth servo 6, an elevation servo (not shown) and a range servo 7, respectively, by means of which servos the target can be tracked in azimuth, elevation and range. To this effect, signals $\Delta B$, $\Delta E$ and $\Sigma$ are fed, via waveguides 8, 9 and 10, to the receiver 2, in which they are processed in separate channels. For the sake of simplicity, the receiver channel processing the $\Delta E$ signal is not shown in the figures, since this channel corresponds entirely with the $\Delta B$ channel which will now be described.

The $\Delta B$ channel comprises successively a mixer 11, an intermediate-frequency amplifier 12, a phase-sensitive detector 13, a boxcar detector 14, a doppler filter 15 and a low-frequency amplifier 16. In the mixer 11 the high-frequency $\Delta B$ signal is converted into an intermediate-frequency signal with the use of a local oscillator 17. After being amplified, the intermediate frequency signal is mixed with the output signal of a coherent oscillator (coho) 18.

Since the transmitter 1 consists of an oscillator, which only operates during the pulse duration, the phase of the signal thereof is distributed practically at random with respect to the output signal of the local oscillator 17. In order to offset the respective consequences, these two signals are fed to a mixer 19. The output signal of this mixer is then supplied to the oscillator 18 in such a way that this oscillator is forced to assume the same phase. The signal supplied by the coho 18 is thus a replica of the transmitter frequency, transformed however to the intermediate frequency. In this way the echo of an ideal fixed target at an intermediate-frequency lever has invariably the same phase relationship with respect to the coho signal, so that after mixing in the phase-sensitive detector 13 a pulse with constant amplitude is obtained. For a moving target the above-mentioned phase relationship and, hence, the amplitude varies as the doppler frequency shift.

The boxcar detector 14 connected to the phase sensitive detector 13 has two functions. Firstly, a range selection occurs in this detector, that is, only the echo pulses, which fall within a narrow range tracking gate $P_3$ determined by the first gate pulse generator 3, are passed. Secondly, the pulses are stretched in such a way that the output signal of the boxcar is formed by the envelope signal of the selected pulses. This envelope signal is fed, via the doppler filter 15, to the low-frequency amplifier 16 that delivers an output signal of which the amplitude is a measure for the angular error in azimuth.

The receiver channel processing the sum signal $\Sigma$ comprises a mixer 20, an intermediate-frequency amplifier 21 and a phase-sensitive detector 22. With the aid of these elements the high-frequency sum signal is processed in the same way as described above for the $\Delta B$ signal, so that also in this case, after coherent detection a pulse with constant amplitude is obtained for echoes of fixed targets, while this amplitude for echoes of a moving target varies as the doppler frequency shift.

In order to eliminate fluctuations due to changes in the target range and/or the total reflecting target surface, the intermediate-frequency difference signals are standardized with respect to the intermediate-frequency sum signal with the aid of an AGC circuit 23 connected to the output of the intermediate-frequency amplifier 21.

The receiver sum channel differs from the difference channel in that the output signal of the phase-sensitive detector 22 is fed to two boxcar detectors 24 and 25 which are each supplied with a different range selection gates $P_1$ and $P_2$ respectively, the trailing edge of the range selection gate $P_1$ coinciding with the leading edge of the range selection gate $P_2$. The total pulse length of the two range selection gates $P_1$ and $P_2$, corresponds to the pulse length of the above-mentioned narrow range tracking gate $P_3$. If the aligned leading and trailing edges of said range selection gates coincide with the axis of symmetry of the sum video, the two boxcars 24 and 25 supply an equal output signal. In the other case a difference arises. The output signals of the two boxcar detectors 24 and 25 are now fed, via doppler filters 26 and 27 respectively, to a sum-and-difference circuit 28 containing a sum amplifier and a difference amplifier as shown in U.S. Pat. No. 3,460,141 of which the difference output and the sum output are each connected to low-frequency amplifiers 29 and 30 respectively. The amplitude of the output signal of the low-frequency amplifier 29 is a measure for the range error.

Each of the output signals of the low-frequency amplifiers 16 and 29 forms a first output signal of the receiver, while the sum signal at the output of the low-frequency amplifier 30 forms a second output signal of the receiver.

In spite of the fact that automatic gain control is applied at intermediate-frequency level, the low-frequency Σ signal is not constant; for attenuation occurs if the echo of the target being tracked coincides with the relatively strong echo of a fixed target, because the l.f. AGC keeps the sum constant. In order to offset this, the gain in the low-frequency amplifier stages is determined by an AGC circuit 31 (l.f. AGC) which keeps the output signal of the Σ amplifier 30 constant on the basis of the average value. At the same time, the other l.f. amplifiers 16 and 29 are controlled passively.

Since the two first output signals of the receiver consist of an a.c. voltage, they are compared with the signal originating from the l.f. amplifier 30 in phase sensitive detectors 32 and 33 respectively, to determine the sign of the angular error and range error, respectively, indicated by these signals. The output signal of detector 32 is then fed via a filter 34, to the servo b for the control of the antenna 5 in azimuth. The output signal of detector 33 is fed, via a filter 35 and a speed integrator (speed Miller) 36 to the range servo 7. This servo comprises a relay 37, a range integrator (range Miller) 38, a differential amplifier 39, and a time modulator 40. To connect range integrator 38 to speed integrator 36 the contact of the relay is set manually to position $b$. The time modulator 40 is started by each synchronization pulse $\bar{S}$, whereupon it delivers a range pulse after a period that varies with the output voltage of the integrator 38. These range pulses are fed to the first gate pulse generator 3 via the line 41, to determine the moment of appearance of the range tracking gate and the range selection gates produced by this generator, which gates are fed to the boxcar detectors 24, 25 and 14 respectively.

On further considering the operation of such a boxcar detector, it is seen that this detector determines the envelope of the output pulses of a second mixer stage, while the frequency spectrum of this envelope signal contains, in addition to the doppler frequency, also frequency components proportional to the phase variations which are due to the system jitter and internal clutter movement. In view of the variations in the doppler signal frequency, as may occur due to a change in radial speed of the target being tracked, the bandwidth of the doppler filter connected to the output of the boxcar detector is relatively large. For example, the order of magnitude of this bandwith is half the pulse repetition frequency (e.g., from 150 Hz to 2 kHz). Therefore, this filter passes, in addition to the doppler frequency, also the frequency components due to the system jitter and at least a part of the frequency components due to the internal clutter movement.

The frequency components, caused by the internal clutter movement and the system jitter and passed by the filter, determine a noise level. The magnitude of this noise level is, in the worst case, directly proportional to the number of echoes received from fixed targets per transmitted pulse. In order to prevent the noise level from reaching a value at which the detection of the doppler signal is no longer possible, the boxcar detectors are supplied with the above-mentioned gate pulses, causing the boxcar detectors to respond only to the signals of the target being tracked and to the clutter signals received simultaneously with these targets signals. Obviously, such a range selection carried out with narrow range gates in the angular tracking channels, is possible only if the range to the target to be tracked is known with an accuracy of a few meters. However, during the acquisition procedure preceding the automatic tracking, the range to said target, already detected by the search radar apparatus, is known with a considerably less accuracy, so that it will be quite toilsome and time-consuming for the radar operator to set the radar tracking apparatus such that the target to be tracked can be acquired. In order to acquire this target quickly and easily, the radar tracking apparatus is provided with a target take-over circuit 42 in which a number of parallel-connected range gate channels 43$a-z$, a control circuit 44 and the afore-mentioned range servo 7 are contained. The operation of the target take-over circuit 42 can be divided into three phases, of which the third phase has already been described. As mentioned for the third phase, range pulses to be supplied to gate pulse generator 3 are derived from the output signals of speed integrator 36 by means of range servo 7. (The relay circuit 37 is set manually to position $b$.) In the first phase a radar operator can derive a series of range values from the position of the target to be tracked, as displayed on a plan position indicator (PPI) 45, on the basis of the information obtained by the search radar apparatus; for the range value that is obtained in first instance and approximates the target range is to be redetermined each time, owing to the displacement of the target being tracked. Each target range value, so obtained, determines the moment of generation of a radar pulse, which is needed for the control of the first gate pulse generator 3 in order to produce a range tracking gate and the range selection gates. Also the tracking radar antenna is to be aligned with the momentary target azimuth value, which can be derived from the momentary target position on PPI 45. When the operator estimates that the tracking radar antenna has been aligned with said momentary azimuth value, and that the gate generation by gate generator 3 corresponds with the "round trip" travelling time of the transmitted pulse, an elevation scan of this antenna can be initiated. Only if the correct range value is obtained, and the antenna is directed correctly, echo signals of the target to be tracked can be detected by the radar. Detection of said echo signals implies the termination of the first phase and the initiation of the second phase. In the second phase, being of very short duration, the moment of generation of a range pulse during each interpulse period, which moment is coarsely determined with the aid of PPI 45, will be changed exactly on the basis of the target video information stored in the control circuit 44. As regards the first phase, a given voltage value corresponds with each of the approximated range values derived from the target position on the PPI 45. Each of the voltages thus derived from the PPI 45 is applied to a first control circuit contained in the range servo 7; this control circuit comprises the relay circuit 37, the range integrator 38 and the differential amplifier 39, where the contact of the relay has been set to position a manually. With the aid of said control circuit the output voltage of the integrator 38 is made equal to the momentary voltage derived from the PPI 45 and therefore corresponds with the momentary approximated range value.

During the period when one of the above-mentioned voltages is applied to the range servo 7, the time modulator 40 produces a series of range pulses, where the time duration between the moment at which a synchronization pulse $\hat{S}$ is delivered and the moment at which the time modulator 40 supplies the next range pulse, depends on the magnitude of the voltage required for the generation of this range pulse and is therefore in linear relationship with the relevant range value. Even if a set range value remains unchanged for some time, the time modulator 40 will, each time after the supply of a sync pulse $\hat{S}$, still produce a range pulse representing this range value. Since the pulse repetition time is in the order of milliseconds and the alignment of the tracking antenna in azimuth and elevation with the target being tracked will take some seconds, one of the causes being the continual displacement of the target position, a considerable series of range pulses will be generated during such an alignment procedure.

Said range pulses are fed successively to a counter 46, which is part of the control circuit 44 and is reset each time, while the starting moment of the counter 46 always coincides with the appearance of the synchronisation pulses $\hat{S}$.

Upon the supply of each synchronisation pulse $\hat{S}$ the counter 46 builds up a counter position which is continuously introduced to a digital comparator 47 and a gate circuit 48; the counter 46 is each time stopped with the aid of a range pulse delivered by the time modulator 40. A connection between the counter 46 and a subtractor 49 is effected only if a range pulse, functioning as a write pulse is fed to the gate circuit 48. Therefore, the subtractor 49 takes over the counter position only after the counter has stopped. When the counter 46 is reset the gate circuit 48 is disabled. In the subtractor 49 a counter position thus supplied is reduced by a constant value permanently stored in a register of the subtractor; this constant value corresponds to a part of the wide range gate (in the embodiment in question this part is half the wide gate), within which the target to be tracked is considered to be located. Such a reduced counter position can finally be fed, via a stepping circuit 50 to be described later, to the digital comparator 47 which is also supplied with the momentary position of the counter 46 restarted by the next synchronisation pulse $\hat{S}$. In case of equivalence of the counter positions thus supplied to the digital comparator 47, a second gate pulse generator 51 is actuated. The gate pulse generator 51 produces a number of gate pulses, which number corresponds with the number of range gate channels 43$a$–$z$ in the target take-over circuit 42. In this embodiment the generator 51 comprises a shift register consisting of a number of flip-flops, which number corresponds with the number of range gate channels 43$a$–$z$. Thus each range gate channel is connected to the output of the respective flip-flop. On starting said shift register by the output pulse of the comparator 47, the flip-flops subsequently generate said gate pulses. The shift frequency of the shift register is defined by clock pulses, which are delivered by a clock, incorporated in the generator 51, said clock being continuously aligned wiith sync pulses $\hat{S}$. With the aid of said gate pulses the access to each of the range gate channels 43$a$–$z$ is enabled and disabled successively. Each of these range gate channels is, as usual, built-up of a box-car detector, a doppler filter, and a quantiser, which are not shown in the figure.

The supply of each of the range values, reduced by the subtractor 49, to the digital comparator 47 presents difficulties, since the range gates are then set to continually changing ranges; for a range gate channel 43$i$ could then well detect target echoes after changing of the moment at which the second gate pulse generator 51 is started, if it had not received any target echoes initially. The result is that the respective channel will contain a stepped signal component of which the components within the bandwidth of the doppler filter provide a signal which could be identified by means of an echo signal of a moving target.

In order to avoid such unusable information as much as possible, not every value supplied by the subtractor 49 should be fed to the digital comparator 47, but only those values which exceed a fixed defined deviation with respect to the value last supplied to the digital comparator 47. To realise this, the stepping circuit 50 is provided with a threshold circuit 52 and a register 53. A value derived from the subtractor 49 is now fed to register 53 and the threshold circuit 52. Also, the value already stored in the register 53 is fed to the threshold circuit 52. If it is found that, after comparision of the two values fed to the threshold circuit 52, the above-mentioned deviation between these values is exceeded, the threshold circuit 52 sends a signal to register 53, causing the value of this register to be replaced by the value derived from the subtractor 49 and fed direct to register 53.

It may be preferred to provide the stepping circuit 50 with a disabling circuit 54, which disables the range gate channels 43$a$–$z$ for a fixed defined period after the start of the threshold circuit 52, in order to suppress any echo signal present. By coupling the choice of this period to the step response of a doppler filter, it is prevented that said unusable information, originating from a step function, is processed by the target take-over circuit 42. The alignment of the tracking antenna and also the adjustment of a wide range gate is completed at the moment when a range gate channel 43j, then enabled, produces an output signal from the arriving target echoes.

An output signal thus obtained is accepted by the relevant logic circuit 55j, which consists of a memory 56j and a square wave generator 57j connected thereto. In the preferred embodiment both the memory 56j and the square wave generator 57j are formed by bistable elements such as flip-flops. When no target echoes are detected by the range gate channels 43a–z, thus the output of these channels will be low, each of the memories 56a–z delivers a voltage corresponding to the logic state "O." However, when target echoes are detected by a range gate channel 43j, the output signal of this channel is stored in the respective memory (43j), thus delivering an output signal of logic state "1." With the aid of this latter output signal, the respective square-wave generator (57j) produces the aforementioned square-wave reference voltage. The duration of each square wave-form of this square-wave reference voltage corresponds to the target range at the moment of detection. For the moment at which a sync pulse Ŝ appears and is fed to the generator 57j, is also the moment at which a leading edge of a square waveform should appear. The time, at which the trailing edge of a square waveform appears, is, however, dependent upon the relative square wave generator. Memory 56j, storing the target video information causes that the trailing edge of a square wave-form appears at the same moment at which the second gate pulse generator 51 produces the gate pulse to be fed to the respective square wave generator 57j. The trailing edges of the square wave voltages of the remaining square wave generators appear at the end of each interpulse period, and can therefore be left out of consideration.

For the purpose of an adjustment of the last range pulse preceding the detection of the echo signal, during the second phase of the operation of the take-over circuit 42, which adjustment is further described hereinafter, it is however required that the width of the square waveform to be generated remains unchanged. Thus the moment of appearance of each two successive trailing edges and therefore also the moment of appearance of the relevant gate pulses, including those of the relevant start pulses for the second gate pulse generator 51, should comprise the same constant time interval. This implies that the value required for the generation of said start pulses and stored in the register 53, may not be changed during the adjustment of the estimated range value available at the moment of detection. This is realised by the inclusion of a blocking circuit 58 in the stepping circuit 50. With the aid of the blocking circuit 58, the logic circuit 55j involved in the detection process disables the supply of new reduced range values to the register 53 for a fixed defined period; during this period the estimated range value should be adjusted. Furthermore, it should be prevented that in said second phase the echo signals received by the tracking radar are registered by one or more logic circuits 55a–z, as this would cause confusion in the adjustment of siid range value. For this purpose the logic circuit 55j ensures that the blocking circuit 58 disables the access to each of the logic circuits 55a–z during the second phase. Furthermore, the blocking circuit 58 is also capable of switching the contact of the relay circuit 37 from position a, assumed in the first phase, to position c. In the latter position, a second control circuit, containing a time discrimination circuit 59, the range integrator 38 and the time modulator 40, is obtained. In the time discrimination circuit 59, which is supplied with said square-wave reference voltage, a second square-wave reference voltage is generated, while the leading edge of the latter square waveform appears simultaneously with that of the former square-wave reference voltage, thus at the moment of generation of a sync pulse Ŝ.

The moment at which the first trailing edge of the second square-wave reference voltage should appear is, however, determined by the time at which the time modulator 40 delivers the range pulse that is derived from the momentary estimated range value. If in the second control circuit the length of the squares of the two square-wave voltages differs, a difference square wave is produced, which is converted into an analogue control voltage with which the moment of appearance of the next range pulse is adjusted.

The moment of appearance of the trailing edge of the square waveforms of the subsequent second square-wave voltage is determined by the adjusted range pulse available at that moment. This processs should continuously be repeated until either a set accuracy of the last generated and corrected range pulse has been reached or a fixed time has elapsed within which it may be assumed that the adjustment process has been completed. On reaching the desired accuracy, which can be measured by a second comparator (not shown in the drawings) or on the expiration of said fixed time determinable by a clock (not shown in the drawings), the comparator or the clock causes automatic switching of the contact of relay circuit 37 from position c, assumed in the second phase, to position b. This switching action of the relay 37 activates the range tracking system, while the gate pulse generator 3 supplies the first narrow range selection gates $P_1$ and $P_2$ and also the first narrow range tracking gate $P_3$ to the boxcar detectors 25, 24 and 14 respectively, with the aid of the range pulse thus adjusted.

Figure 2:
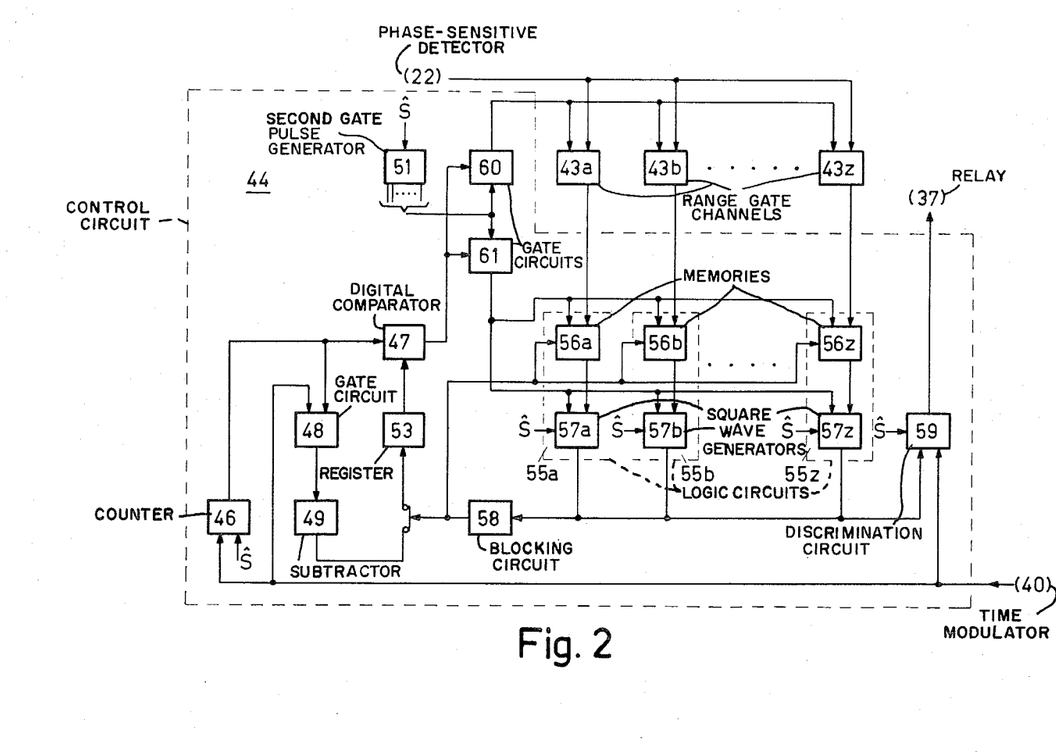
FIG. 2 shows a part of a second embodiment of a target take-over circuit in accordance with the invention.

It should be emphasised that in this embodiment the problem concerning the generation of a stepped signal component, in the case of a doppler filter, is solved by inserting a stepping circuit 50 in the control circuit 44. This is an effective solution when the selection of narrow range gates for the purpose of target detection occurs at the input side of the range gate channels. Another method by which said problem may be solved is to select the narrow range gates for purpose of target detection, at the output side of the series of range gate channels, as described with reference to FIG. 2 showing a part of a second embodiment of the target take-over circuit.

This circuit comprises again a number of parallel-connected range gate channels 43a–z and a control circuit 44. If, in this embodiment, components of the device are not further described, an analogous description, as given in the first embodiment, applies to these components. With each range pulse delivered by the time modulator 40 with the counter 46, the momentary counter position of this counter is passed on on to the subtractor 49, via the gate circuit 48. After the magnitude of this counter position has been reduced by half the magnitude of the wide range gate in the subtractor 49, the result thus obtained is stored in register 53 and also supplied to the digital comparator 47. At the moment of equivalence between the last reduced value supplied to the digital comparator 47 and the next momentary value assumed by the counter that has been restarted, the comparator 47 delivers a signal to two gate circuits 60 and 61; upon the receipt of each signal, the gate circuit 60 feeds the gate pulses derived from the second gate pulse generator 51 to the range gate channels 43a– during a period corresponding with the wide range gate, so that the access to each of the range gate channels 43a–z is enabled and disabled successively. In this embodiment of the target take-over circuit the second gate pulse generator 51 functions as a ring counter which is started with each sync pulse $\hat{S}$ while output $i$ of the second gate pulse generator 51 corresponds with the range gate channel 43$i$. The application of the synchronization signal $\hat{S}$ as start pulse of the second gate pulse generator 51 infers that each range gate produced by the gate pulse generator 51 is fixed in range, so that range gate channel 43$i$ can receive only echo information from certain narrow range gates fixed in range. This collection of narrow range gates is represented by $t_{n,i} = i + nz$, where $i$ is the number of the respective output of the second gate pulse generator 51 and the relevant range gate channel 43$i$, $z$ the number of outputs of the second gate pulse generator 51 and $n$ a whole number. Of each series of narrow range gates $t_{n,i}$ the echo signal, derived from the fixed narrow range gate and present during the period determined by the first gate circuit 60, is admitted to the relevant range gate channel 43$i$ with the aid of the first gat circuit 60. Since the moment of actuating the first gate circuit 60 is determined by the moment of appearance of a range pulse and since this moment may be changed continuously, it will be clear that only the doppler filters, inserted in the range gate channels which detect target echoes originating from the narrow range gate situated at the edge of a wide range gate, are impeded by stepped signal components; therefore, such range gate channels cannot be used in the detection process; only echo information derived from a number of centrally situated narrow range gates is applied in the detection process. In view of this, the control circuit 44 contains a second gate circuit 61 which is actuated only during a fixed determined part of said period. The second gate circuit 61 may be considered to be two in series connected monostable elements, where the first element is actuated by the digital comparator 47. During the operation of the second monostable element a quantized video signal originating from range gate channel 43$j$ is accepted only by the logic circuit 55$j$ connected to this range gate channel if the relevant access is opened and closed by a gate pulse. When the logic circuit 55$j$ receives a quantized video signal, the blocking circuit 58 disables the access to each of the logic circuits 55$a$–$z$ including those to the register 53 during the subsequent adjustment of the last range pulse preceding the detection of the echo signal. The adjustment procedure of said range pulse is analogous to that described in the first embodiment; however, it should be noted that only the gate pulses, present at the time interval which is determined by the second gate circuit 61 with the aid of the value recorded in register 53, are admitted to the square-wave generators 57$a$–$z$ contained in the logic circuits 55$a$–$z$.

What we claim is:

1. Target take-over circuit for a radar system which comprises a radar search and a radar tracking apparatus and which is provided with a number of range gate channels connected in paralle, a control circuit and a range servo, where the control circuit contains at least a gate pulse generator with the aid of which the access to each of the range gate channels is enabled and disabled successively, which target take-over circuit causes, during the time when the tracking radar is being aligned with the indicated azimuth value of a target detected by the search radar and is performing an elevation scan, a wide range indication gate to follow up a series of estimated range values, each of which corresponding with a continually changing target range obtained by means of the search radar, which range indication gate is divided into a number of gates corresponding with the number of range gate channels, and as soon as the tracking radar has detected the target in one of the range gate channels, the control circuit aligns the range servo with the momentary target range, wherein a time modulator is contained which, upon the supply of said series of range values, produces a series of range pulses rendering successively with the aid of a counter of the control circuit, a series of counter positions that represent the above-mentioned range values; and wherein the control circuit is further provided with a digital comparator, in which the momentary position of the counter is compared with a value derived from a counter position already obtained, which comparator indicates, in the case of equivalence, a time interval during which the gate pulses originating from the gate pulse generator are fed to the respective range gate channels, and also with a number of logic circuits, each of which being connected to a corresponding range gate channel, while the logic circuit that is supplied with a quantised video signal delivers a square-wave reference voltage of which the duration corresponds with the above-mentioned target range valid at the moment of detection and the range servo responsive to the range pulse last obtained, follows up the trailing edge of said square-wave reference voltage, whereupon a range tracking system is actuated.

2. Target take-over circuit as claimed in claim 1, wherein the control circuit is provided with a blocking circuit and a register inserted in the connection between the counter and the digital comparator for the purpose of transferring a value, derived from a counter position already obtained, to the digital comparator, and wherein each logic circuit comprises a memory and a square-wave generator connected to said memory, which memory supplied with a quantised video signal, causes that, on the one hand, the blocking circuit disables the access to the register and also to each of the memories for a fixed defined period during which, on the other hand, the relevant square-wave generator delivers said square-wave reference voltage, which fixed defined period is such that, after the generation of the square-wave reference voltage, the range servo has aligned itself with the trailing edge of said reference voltage even within said period.

3. Target take-over circuit as claimed in claim 2, wherein a subtractor is provided between the counter and said register, in which subtractor a supplied counter position is subjected to a reduction whose magnitude corresponds preferably to half the magnitude of the range of said wide range gate.

4. Target take-over circuit as claimed in claim 3, wherein a threshold circuit is inserted between the subtractor and said register, with which threshold circuit a value derived from the subtractor is stored in the register only if said value exceeds a fixed defined deviation with respect to the value already contained in the register.

5. Target take-over circuit as claimed in claim 4, wherein the value derived from the subtractor is introduced to the register and also to the threshold circuit, which is also supplied with the value already stored in the register, while the threshold circuit delivers a signal to the register if said deviation between the two signals supplied is exceeded, which signal causes the value already contained in the register to be replaced by the value derived from the subtractor and directly introduced to the register.

6. Target take-over circuit as claimed in claim 3, wherein the gate pulse generator is designed as a ring counter, which is restarted with the aid of a synchronisation signal and of which each output corresponds with one of the range gate channels, and wherein the control circuit contains two gate circuits, of which a first gate circuit causes that each gate pulse produced within a time interval corresponding with a wide range gate, and restarting at the moment of equivalence detected by the digital comparator, enables and disables the access to the relevant range gate channel, and of which the second gate circuit causes that each gate pulse, produced within a fixed defined part of said time interval, enables and disables the access to the memory, in so far as the latter access has not been disabled by the blocking circuit, and also the access to the square-wave generator of the relevant logic circuit.

7. Target take-over circuit as claimed in claim 2, in which circuit each of the range gate channels includes a boxcar detector, a doppler filter and a quantizer, wherein the control circuit contains a disabling circuit which, in case of a change in the value contained in the register, disables all range gate channels for a fixed defined period in order to suppress each echo signal then available, since, in consequence of the displacement of a range area to be covered by a range gate channel, said displacement accompanying said change, a jumpwise variation in the detected clutter strength is obtained, said variation occurring per range gate channel and resulting in unusable information not discernable from doppler signals by the range gate channel.

8. Target take-over circuit as claimed in claim 2, wherein each of the square-wave generators is constituted by a bistable element, which is continuously supplied with a gate pulse from the gate pulse generator at the same moment at which the corresponding range gate channel receives a gate pulse, while, during the time interval indicated by the digital comparator, the bistable element of the logic circuit receiving the quantized video signal delivers said square wave voltage of which the appearance of the trailing edge is determined by the supplied gate pulse.

9. Target take-over circuit as claimed in claim 1, wherein the range servo contains a range integrator and the time modulator already stated, and wherein the control circuit comprises a time discriminating circuit where the range integrator is provided with a setting, initially through a voltage originating from the search radar and representing an estimated target range and, subsequently, through a voltage originating from the time discriminating circuit, from which setting, with the aid of the time modulator, a range pulse and a second square-wave are obtained, the appearance of the trailing edge of said second square-wave voltage being determined by said range pulse, while, after the supply of said second square-wave voltage and the square-wave voltage from a logic circuit in case of non-concurrent trailing edges, the time discriminating circuit produces a control voltage for correcting the setting of the range integrator.

10. Target take-over circuit as claimed in claim 1, for the purpose of a monopulse radar apparatus, which is provided with a range tracking system operated by narrow range tracking gates, wherein a relay is contained, which relay causes that, after the operational time of the target take-over circuit, the range integrator and time modulator pertaining to the range servo are incorporated in said range tracking system.

* * * * *

PO-1050
(5/69)

UNITED STATES PATENT OFFICE
CERTIFICATE OF CORRECTION

Patent No. 3,820,113                    Dated   June 25, 1974

Inventor(s)   BERNARD GELLEKINK and THEODORUS ALBERTUS CLEMENS KRADOLFER

It is certified that error appears in the above-identified patent and that said Letters Patent are hereby corrected as shown below:

ON THE TITLE PAGE

Section [75] Inventors, line 2 should read

--Theodorus Albertus Clemens Kradolfer--;

Section [73] Assignee, line 1 should read

--N.V. Hollandse Signaalapparaten--;

IN THE SPECIFICATION

Col. 5, line 40, "1.f" should be --i.f.--;

line 42, "1.f." should be --l.f.--;

line 45, "1.f." should be --l.f.--;

line 49, "1.f." should be --l.f.--;

Col. 5, line 53, "servo b" should be --azimuth servo 6--;

Col. 9, line 63 "siid" should be --said--;

Col. 10, line 63, cancel "on" second occurence

Col. 11, line 31, "gat" should be --gate--;

IN THE CLAIMS

Claim 1, line 4, "paralle" should be --parallel--;

Signed and sealed this 31st day of December 1974.

(SEAL)

Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,820,113          Dated June 25, 1974

Inventor(s) BERNARD GELLEKINK and THEODORUS ALBERTUS CLEMENS KRADOLFER

It is certified that error appears in the above-identified patent and that said Letters Patent are hereby corrected as shown below:

IN THE SPECIFICATION

Col. 4, line 38, "lever" should be --level--;

Col. 5, line 10, "gates" should be --gate--;

Col. 6, line 32, "targets" should be --target--;

Col. 10, line 25, "processs" should be --process--;

Col. 10, line 62, "with" should be --to--;

Col. 11, line 9, "43a-" should be --43a-z--;

IN THE CLAIMS

Claim 9, line 11, "square-wave" should be

--square-wave voltage--;

Signed and Sealed this seventh Day of October 1975

[SEAL]

Attest:

RUTH C. MASON  
Attesting Officer

C. MARSHALL DANN  
Commissioner of Patents and Trademarks